Nov. 2, 1948.  R. B. KILLINGSWORTH ET AL  2,453,094
OXIDIZED ASPHALT PRODUCT AND METHOD OF MAKING SAME
Filed Dec. 18, 1945
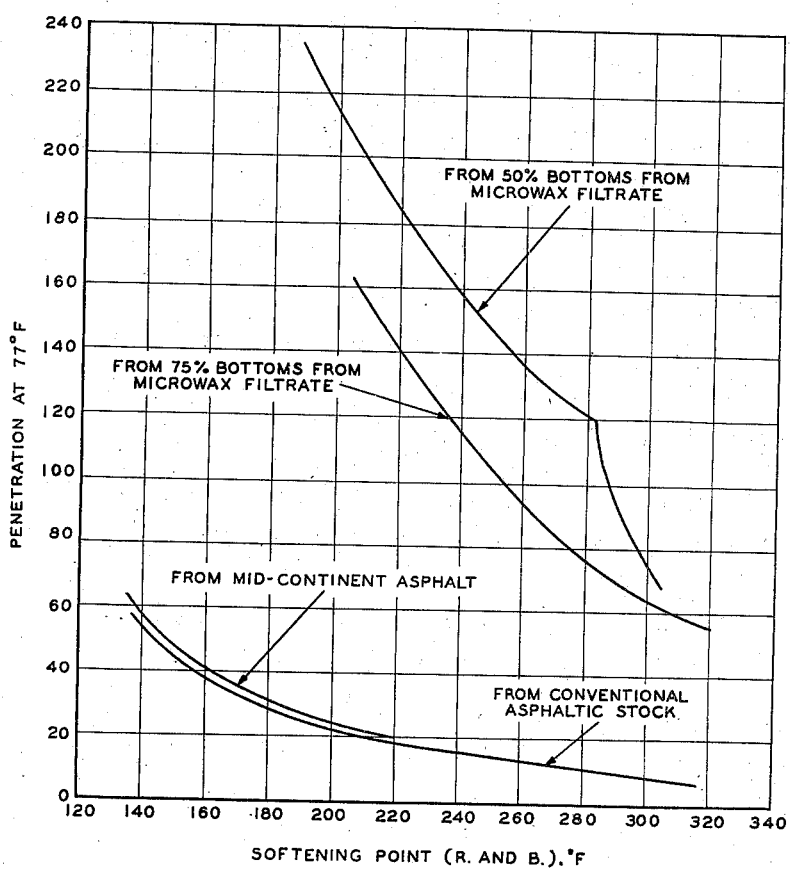
Robert B. Killingsworth,
Harry T. Van Horn,
Wallace E. Spelshouse
INVENTORS
BY
ATTORNEY Patented Nov. 2, 1948

2,453,094

UNITED STATES PATENT OFFICE 2,453,094

OXIDIZED ASPHALT PRODUCT AND METHOD OF MAKING SAME

Robert B. Killingsworth, Douglaston, Harry T. Van Horn, Kew Gardens, and Wallace E. Spelshouse, Roslyn Heights, N. Y., assignors to Socony-Vacuum Oil Company, Incorporated, a corporation of New York Application December 18, 1945, Serial No. 635,758

2 Claims. (Cl. 196—74)

This invention has to do with an asphaltic product of novel origin and characteristics.

In the refining of petroleum oils, it is customary to separate the wax bearing portion of the oil by distillation into two fractions. One of these fractions known as wax distillate contains crystalline waxy materials of the nature of ordinary paraffin, that is, materials having crystals of comparatively large size. The distillate product next above wax distillate in boiling point, which may be separated, dependent upon the nature of the crude, either as an overhead distillate cylinder stock or a residual cylinder stock, contains microcrystalline waxes. These microcrystalline waxes, frequently appearing in the literature and in the trade under the terms amorphous waxes or petrolatum waxes are similarly of a crystalline nature, but of such extremely small crystal size as to have given rise to the belief for a good many years that they were not possessed of a crystalline structure. In further refining of the cylinder stock cut, be it an overhead stock or a residual stock, it is customary to separate microcrystalline wax from it by a process of chilling agglomeration of wax, and physical separation of wax from oil and crude petrolatum. Crude petrolatum is a stock consisting predominantly of microcrystalline waxes associated with some oily material. In the further working up of this crude petrolatum, it is customary to dilute the material with a solvent and by a process of further chilling and precipitation, separate from its microcrystalline waxes usually of about 150 melting point and higher, leaving behind an oily material which contains apparently soften microcrystalline wax materials, some of the original cylinder stock fraction and other oily materials apparently related in nature more closely to the microcrystalline wax materials than to the fluid oils from which the waxes were separated. This is indicated by the high viscosity index of the material, which usually is above 80. We are not aware that these oily materials separated from crude petrolatum have heretofore been utilized for the manufacture of blown asphalts and have found that by blowing these materials with air, and oxidizing them to form asphaltic materials of the usual grades of 130–140 softening point and higher, that we have been able to produce blown asphaltic materials of a highly unusual nature.

In working up these oily materials, we have found it advisable to first subject them to a distillation to remove from them lower boiling hydrocarbons constituting from 25% to 50% of the entire oily material and then to subject the remainder to blowing to give asphalt of desired softening point grade.

In this manner, we have been able to make a very unusual type of asphaltic material which has properties suggesting its use either alone or in admixture with waxes either of paraffinic or microcrystalline nature to form coatings, rust preventive compounds, potting compounds, wire rope lubricants and laminating materials. For example, if these asphaltic materials are mixed in equal percentages with a petrolatum product of 120–135 melting point, it is found that an entirely homogeneous mixture results with no evidence of phase separation. The remarkable temperature-susceptibility characteristics of these asphalts suggests many other uses as modifiers of conventional asphalts to meet specialized requirements.

An idea of the rather unusual characteristics of these asphalts may be gained from inspection of the drawing attached to this specification, wherein asphalts prepared as herein disclosed are compared with conventional blown asphaltic materials from usual sources as to penetration vs. softening point. In this drawing the two lower curves are blown asphalt products from the indicated sources, one being from a Mid-Continent crude and the other from a conventional asphaltic stock. The upper two curves are for products herein disclosed. One of the curves shows the characteristics of an asphalt produced by distilling from the oily starting material 25% of its content as lower boiling materials and the other shows the properties of asphalt produced after topping from the oily material 50% of its lighter boiling constituents. Two things are noticeable. First, the penetrations are considerably higher for the materials here disclosed than for conventional materials of the same softening point. Second, the slope of the curve is considerably greater for the materials here disclosed than for the conventional materials. No explanation is known at this time for the anomalous shape of the 50% bottoms curve.

Exemplary of these products are the two following materials. First are described the two blowing stocks utilized for their production. These blowing stocks were derived in accordance with the description hereinbefore given by first separating a crude oil by distillation into a microcrystalline wax fraction, and separating from that microcrystalline wax fraction a crude petrolatum by chilling and filtration in the presence of a mixed solvent consisting of benzol and methyl ethyl ketone. Next the crude petrolatum was de-oiled under similar but somewhat changed conditions in the same equipment and in the presence of the same solvents. The oily material separated from the crude petrolatum in de-oiling was treated by distillation to provide: first a stock comprising a 50% bottoms of the original oily material and second, a stock comprising a 75% bottoms of the original oily material, which stocks had the following properties:

TABLE I

|  | 50% Bottoms | 75% Bottoms |
|---|---|---|
| Gravity, °API | 29.0 | 29.6 |
| Flash, crucible, °F | 600 | 600 |
| Kinematic Viscosity @ 100° F.: | | |
| Centistokes | | 258.2 |
| S. U. Equivalent, secs | | 1193 |
| Kinematic Viscosity @ 130° F.: | | |
| Centistokes | 118.0 | |
| S. U. Equivalent, secs | 546 | |
| Kinematic Viscosity @ 210° F.: | | |
| Centistokes | 24.5 | 21.0 |
| S. U. Equivalent, secs | 118 | 102 |
| Viscosity Index | 115 | 103 |

These two stocks are then oxidized by blowing with air to produce asphalts of a conventional range of softening points. The materials produced from the 50% bottoms are shown in Table II.

TABLE II

| Soft. Pt. (R & B), °F. | Pen. 77/100/5 | Pen. 32/200/60 | Pen. 115/50/5 | Sol. 88° Naph., per cent | Sol. CCl4, per cent | Sol. CS2, per cent |
|---|---|---|---|---|---|---|
| 188 | 235 | 58 | Too soft | 93.82 | 99.69 | 99.75 |
| 238 | 159 | 50 | 185 | | | |
| 281 | 120 | 35 | 128 | | 99.55 | |
| 288 | 95 | 30 | 103 | | | |
| 304 | 68 | 27 | 73 | 67.73 | 96.67 | 99.78 |

The materials produced by oxidizing 75% bottoms are shown in Table III.

TABLE III

| Soft. Pt. (R & B), °F. | Pen. 77/100/5 | Pen. 32/200/60 | Pen. 115/50/5 | Sol. 88° Naph. per cent | Sol. CCl4, per cent |
|---|---|---|---|---|---|
| 113 | Too soft | 80 | | 99.80 | 99.97 |
| 204 | 163 | 58 | 215 | 75.53 | 99.82 |
| 258 | 95 | | 122 | | 98.13 |
| 284 | 72 | | 91 | 61.20 | 98.13 |
| 329 | 55 | 39 | 60 | 56.19 | |

Both the 50% and 75% bottoms oxidized to substances which are unique in their properties, when compared with normal asphalts. They are much softer than conventional asphalts of corresponding softening points, are much more soluble in petroleum naphtha, and have good temperature-susceptibility. They are miscible with petrolatums and microcrystalline waxes to a considerably greater extent than regular asphalts. These oxidized bottoms, even of as high a hardness as 288° softening point, when used in thin films as paper laminants are flexible at temperatures as low as −10° F. By comparison, Table IV below, sets forth comparable penetrations for asphalts of similar hardness produced by blowing a Mid-Continent crude fraction and by blowing a conventional asphaltic (Talco) crude fraction.

TABLE IV

Oxidized asphalts from Mid-Continent crude

| Grade | 130–140 S. P. | 160–180 S. P. | 180–200 S. P. | 215–225 S. P. |
|---|---|---|---|---|
| S. P. (R & B), °F | 134 | 174.5 | 185 | 221 |
| Penetration: | | | | |
| 77° F./100 gr./5 sec | 64 | 35 | 29 | 21 |
| 32° F./200 gr./60 sec | 32 | 23 | 19 | 15 |
| 115° F./50 gr./5 sec | 187 | 63 | 52 | 32 |

Oxidized asphalts from asphaltic (Talco) crude

| Grade | 130–140 S. P. | 160–180 S. P. | 180–200 S. P. | 220–235 S. P. | 300–315 S. P. |
|---|---|---|---|---|---|
| S. P. (R & B), °F | 136½ | 170 | 193 | 234 | 314 |
| Penetration: | | | | | |
| 77° F./100 gr./5 sec | 58 | 33 | 25 | 19 | 6 |
| 32° F./200 gr./60 sec | 27 | 20 | 18 | 15 | 3.5 |
| 115° F./50 gr./5 sec | 173 | 63 | 48 | 35 | 8 |
| Solubility: | | | | | |
| 88° Naphtha, per cent | | 64.4 | 60.4 | | |
| CCl4, per cent | | 99.82 | 99.82 | 99.80 | 99.62 |
| CS2, per cent | | 99.88 | 99.85 | 99.85 | 99.76 |

Taking as a basis of comparison the penetrations at 115° F. and 77° F. we note that the ratio of these two values is 3:1 for the softer grades of conventional blown asphalts and reaches the lowest ratios of 1½:1 only for the hardest grades.

while the novel asphalts herein disclosed maintain a ratio of 1¼:1 or less practically throughout the range shown.

Another approach for demonstrating the lesser change of consistency of the novel asphalts over a wide range of temperatures consists in reviewing the relation between the softening point and penetration. From the nature of the ring and ball test it follows that at the temperature of the "softening point" all asphalts have a consistency of the same order of magnitude as measured by their resistance to sagging. As the temperature decreases, asphalts of equal temperature susceptibility should show the same penetration values at the same temperature level and asphalts with higher temperature susceptibility should show lower penetrations, or in other words will become harder. Since the 188 soft point novel asphalt has a penetration of 235 at 77° F. vs. a penetration of 29 for the 185 soft point Mid-Continent grade and a penetration of 25 for the nearest 193 soft point asphalt from Talco crude, it must be concluded that the novel asphalt hardens less as the temperature is lowered from about 185 to 77° F. The 304 soft point, 68 pen. novel asphalt may be compared similarly with the 314 soft point, 6 pen. conventional asphalt. The comparison remains also valid for the penetrations taken at 32° F. and 115° F. Pfeiffer and Van Doormaal's method of measuring the temperature susceptibility of asphalt in terms of S. P. T. (softening-point-penetration-temperature index) is given in Abraham's "Asphalts and Allied Substances," 5th edition, vol. 11, p. 1006 as follows:

$$S. P. T. = \frac{\log 800 - \log \text{pen.} @ 77°F., 100 \text{ gr.}, 5 \text{ sec.}}{S. P. (R \& B) °F. - 77}$$

where 800 is the assumed penetration of all asphalts at the softening point temperature. The lower the values of S. P. T., the lesser is the susceptibility of asphalts to changes with temperature.

The following tables give calculated S. P. T. values for the novel asphalts in comparison with those for conventional oxidized asphalts.

|  | Novel Asphalts (from 50% bottoms) | | Mid-Continent Asphalts | | Talco Asphalts | | Mid-Cont.[1] | Lima-Indiana[1] |
|---|---|---|---|---|---|---|---|---|
| S. P. (R & B), °F | 188 | 304 | 185 | 221 | 193 | 314 | 272 | 294 |
| Pen. 77/100/5 | 235 | 68 | 29 | 21 | 25 | 6 | 15.5 | 14.5 |
| S. P. T | .0048 | .0047 | .0133 | .0110 | .0130 | .0090 | .0088 | .0080 |

[1] From Abraham's *l. c. table* L11, Summary of Blown Asphalt.

Asphalts of the nature herein disclosed display an S. P. T. value of the order of .005 to .006, seldom over about .0075.

The unusual combination of good temperature-susceptibility and high penetration for a given high soft point, renders the asphaltic materials herein disclosed highly unique and highly usable articles of commerce.

We claim:

1. That method of making an asphalt of softening-point-penetration-temperature index of 0.0075 or less which comprises: subjecting a petroleum fraction containing microcrystalline wax to separation of oil and wax to produce therefrom a crude petrolatum, separating the crude petrolatum into microcrystalline wax and an oily fraction by treating with a selective solvent for said oily fraction, and recovering the oily fraction from said separation, removing the lower boiling fractions of said oily material by distillation, and blowing the distillation residue to produce therefrom by oxidation an asphaltic material of at least 130–140 soft point grade.

2. That method of making an asphalt of softening-point-penetration-temperature index of from about 0.005 to about 0.006 which comprises: subjecting a petroleum fraction containing a microcrystalline wax to separation of oil and wax to produce therefrom a crude petrolatum, separating the crude petrolatum into microcrystalline wax and an oily fraction by treating with a selective solvent for said oily fraction, and recovering the oily fraction from said separation, removing the lower boiling fractions of said oily material by distillation, and blowing the distillation residue to produce therefrom by oxidation an asphaltic material of at least 130–140 soft point.

ROBERT B. KILLINGSWORTH.
HARRY T. VAN HORN.
WALLACE E. SPELSHOUSE.

REFERENCES CITED

The following references are of record in the file of this patent:

UNITED STATES PATENTS

| Number | Name | Date |
|---|---|---|
| 2,119,940 | Carr et al. | June 7, 1938 |
| 2,158,672 | Carr et al. | May 16, 1939 |
| 2,337,336 | McCluer et al. | Dec. 21, 1943 |

OTHER REFERENCES

Abraham: "Asphalts and Allied Substances," 4th ed., 1938, pages 833 and 835 and table facing page 452. Pub. by Van Nostrand Co., Inc., New York, N. Y.